(12) United States Patent  
Clark et al.

(10) Patent No.: US 6,319,346 B1
(45) Date of Patent: Nov. 20, 2001

(54) METHOD FOR MANUFACTURE OF COMPOSITE AIRCRAFT CONTROL SURFACES

(75) Inventors: Paul Clark, Vista; Jonathan Garhart, Salt Lake City; Dimitrije Milovich, Salt Lake City; Ronald Nelson, Salt Lake City, all of UT (US)

(73) Assignee: Radius Engineering, Inc., Salt Lake City, UT (US)

( * ) Notice: Subject to any disclaimer, the term of this patent is extended or adjusted under 35 U.S.C. 154(b) by 0 days.

(21) Appl. No.: 09/471,629

(22) Filed: Dec. 24, 1999

Related U.S. Application Data (63) Continuation-in-part of application No. 09/441,356, filed on Nov. 16, 1999, now Pat. No. 6,248,024, which is a continuation of application No. 08/839,110, filed on Apr. 23, 1997, now Pat. No. 5,985,197, application No. 08/865,493, filed on May 29, 1997, which is a continuation-in-part of application No. 08/839,110, filed on Apr. 23, 1997, now Pat. No. 5,985,197.

(51) Int. Cl.$^7$ .................................................. B32B 31/00
(52) U.S. Cl. .................. 156/156; 156/245; 156/285; 29/889.6; 244/123; 264/258; 416/226; 416/230
(58) Field of Search ...................... 156/156, 173, 156/175, 245, 285; 264/257, 258, 500, 510; 416/226, 230, 229 R; 29/889.6, 889.72, 889.7; 244/123, 124

(56) References Cited

U.S. PATENT DOCUMENTS

| | | | |
|---|---|---|---|
| 3,962,506 | * 6/1976 | Dunahoo | 156/156 |
| 3,967,996 | * 7/1976 | Kamov et al. | 156/156 |
| 4,081,220 | * 3/1978 | Andrews | 416/226 |
| 4,124,678 | 11/1978 | Stroupe . | |
| 4,169,749 | * 10/1979 | Clark | 156/156 |
| 4,264,278 | * 4/1981 | Weingart | 416/226 |
| 4,329,119 | * 5/1982 | Baskin | 416/226 |
| 4,397,048 | 8/1983 | Brown et al. . | |
| 4,575,447 | 3/1986 | Hariguchi . | |
| 4,581,190 | 4/1986 | Nagamoto et al. . | |
| 4,657,615 | * 4/1987 | Braun | 156/245 |
| 4,759,893 | 7/1988 | Krauter . | |
| 4,808,362 | 2/1989 | Freeman . | |
| 4,828,781 | 5/1989 | Duplessis et al. . | |
| 4,850,607 | 7/1989 | Trimble . | |
| 4,889,355 | 12/1989 | Trimble . | |
| 4,902,458 | 2/1990 | Trimble . | |
| 4,931,247 | 6/1990 | Yeh . | |
| 4,986,949 | 1/1991 | Trimble . | |
| 5,076,601 | 12/1991 | Duplessis . | |
| 5,143,665 | 9/1992 | Clubbs et al. . | |
| 5,156,786 | 10/1992 | Monroe . | |
| 5,207,964 | 5/1993 | Mauro . | |
| 5,314,653 | 5/1994 | Haralambopoulos . | |
| 5,318,742 | 6/1994 | You . | |
| 5,328,176 | 7/1994 | Lo . | |
| 5,350,556 | 9/1994 | Abe et al. . | |
| 5,368,804 | 11/1994 | Hwang et al. . | |
| 5,505,492 | 4/1996 | Nelson et al. . | |
| 5,544,907 | 8/1996 | Lin et al. . | |
| 5,621,967 | * 4/1997 | Frengley et al. | 29/889.6 |
| 5,624,519 | 4/1997 | Nelson et al. . | |
| 5,803,476 | 9/1998 | Olson et al. . | |
| 5,814,268 | 9/1998 | Banshelin et al. . | |

FOREIGN PATENT DOCUMENTS

| | | |
|---|---|---|
| 2250 443 B | 6/1992 | (GB) . |
| 53-34870 | 3/1978 | (JP) . |

* cited by examiner

*Primary Examiner*—Jeff H. Aftergut
(74) *Attorney, Agent, or Firm*—James Lawrence Sonntag (57) ABSTRACT

A process for forming an aircraft control surface in the form of a spoiler from a fiber/resin composite is disclosed. The trailing edge is compression molded by applying pressure on the mold. The leading edge is thick walled in the form of a torsion box and is molded by an internal pressurizable bladder.

2 Claims, 5 Drawing Sheets

METHOD FOR MANUFACTURE OF COMPOSITE AIRCRAFT CONTROL SURFACES

RELATED APPLICATIONS

This application is a continuation-in-part of U.S. patent application Ser. No. 09/441,356, filed Nov. 16, 1999 now U.S. Pat. No. 6,248,024, which is a continuation of copending U.S. patent application Ser. No. 08/839,110, filed Apr. 23, 1997, now U.S. Pat. No. 5,985,197. This application is a continuation-in-part of U.S. patent application Ser. No. 08/865,493, filed May 29, 1997 which is a continuation-in-part of U.S. patent application Ser. No. 08/839,110, filed Apr. 23, 1997, Now U.S. Pat. No. 5,985,197.

STATEMENT REGARDING FEDERALLY SPONSORED RESEARCH OR DEVELOPMENT (Not applicable)

FIELD OF THE INVENTION

This invention relates to the manufacture of aircraft control surfaces, particularly spoilers, from fiber/resin composite materials.

BACKGROUND OF THE INVENTION

Traditionally, the construction of control surfaces for aircraft has been from lightweight metal alloys. For example, for spoilers, frame elements, hinges, actuation fittings and sheet metal have been machined and assembled using appropriate fasteners, such as welding or rivets. Since spoilers are subjected to torsion during use, they are usually made in the form of a torsion box. Because of the many parts that must be assembled, the manufacture of the spoiler by traditional methods requires several machining and assembly steps and is accordingly quite expensive. In addition, at each place where individual parts are attached, there is a potential for failure of the weld or rivet at joint, which increases the possibility of failure of the part.

Composite materials of a cured resin and a reinforcing fiber have been used for certain parts in aircraft construction. Composites have high strength, and are light in weight, both which are desirable for aircraft. However, the use of composites for control surfaces has been limited. This is due in part to the difficulty of making large composite parts of complex configuration while maintaining the strict quality requirements required for aircraft parts. This problem is aggravated by the requirement of the shape of the spoiler, which requires a thick leading edge of high strengths for mounting of hinges and actuation fittings that tapers down to a thin trailing edge that must be of appropriate aerodynamic design. Adhering several pre-manufactured parts with a thermosetting resin can make large assemblies of composite materials. However, this would introduce undesirable points of weakness at the joints of the part, and require precision machining and fitting of the parts. In addition, any machining to form the part into their final shape, either for assembly to another part or for the final aerodynamic shape, is undesirable, for such will cut reinforcing fiber. Accordingly, undesirable weight in the form of extra reinforcing fiber must be added to compensate for the machining and the inherent weakness at joints. These problems have prevented composites from becoming a competitive replacement for metals on these parts, particularly in the commercial market where manufacturing costs must be kept low, and the very high performance required for military supersonic aircraft is not necessary.

It is accordingly, a long felt need in the industry to provide a method for making control surfaces, such as spoilers, that is competitive with traditional metal-assembly methods of the manufacturing, while providing improvements in strength, weight, and simplification of the manufacturing process.

Incorporation but reference

U.S. patent application Ser. No. 09/441,356, filed Nov. 16, 1999, U.S. patent application Ser. No. 08/839,110, filed Apr. 23, 1997, now U.S. Pat. No. 5,985,197 and U.S. patent application Ser. No. 08/865,493 filed May 29, 1997, are hereby incorporated by reference.

Objects of the Invention

It is, therefore, an object of the invention to provide a method for manufacturing an aircraft spoiler control surface of a fiber/resin composite material that solves the above problems.

Another object of the invention is to provide a method for manufacturing an aircraft spoiler control surface of a fiber/resin composite material that is integral in construction, and requires a little of no assembly of separate parts.

Another object of the invention is a to provide a method for manufacturing an aircraft spoiler control surface of a fiber/resin composite material that forms a part near its final shape that requires a minimum of machining.

Another object of the invention is a to provide a method for manufacturing an aircraft spoiler control surface of a fiber/resin composite material that allows the properties of each portion of the spoiler, such the leading and trailing edges, to be optimized for strength and light weight.

Another object of the invention is a to provide a method for manufacturing an aircraft spoiler control surface of a fiber/resin composite material that permits a torsion box construction to optimize the light weight and torsion properties of the spoiler.

Further objects of the invention will become evident in the description below.

BRIEF SUMMARY OF THE INVENTION

The present invention is a process for manufacturing an aircraft spoiler control surface of a generally elongated shape with a teardrop cross-section with a thick leading portion and a thin trailing portion joined by a middle tapered portion, and with at least one metal actuator fitting, and at least one hinge lug cocured into the leading edge portion of the shape, the process comprising:

providing a female cavity mold with a lower half and an upper half, with an elongated molding cavity dimensioned essentially the same as and corresponding to outer surfaces of the elongated shape and extending in the direction of a longitudinal axis, with a corresponding leading portion, a tapered portion and a trailing edge portion;

placing a lower layer of multiple plies of resin impregnated fiber into the lower half of the female mold with a leading lateral edge in the leading portion, and a trailing lateral edge in the trailing portion;

wrapping multiple plies of resin impregnated fiber around a flexible, pressurizable bladder;

placing the wrapped bladder in the mold over the lower layer in the leading portion of the cavity;

placing the rigid mandrel in the mold over the lower layer in the tapered portion with the rigid mandrel and the wrapped bladder extending adjacent to one another and extending generally parallel to the longitudinal axis of the cavity;

placing a metal actuator fitting insert in the mold, the insert comprising a root portion and a head portion with the root portion extending through a lower actuator slot in the leading lateral edge of the lower layer;

placing a hinge lug ply stack in the mold, the hinge lug ply stack comprising a stack of plies of impregnated fiber with a root portion and a head portion with the root portion extending through an lower hinge lug slot in the lateral edge of the lower layer;

placing a upper layer over the wrapped bladder and the mandrel with a leading lateral edge in the leading portion and the trailing lateral edge in the trailing portion, and with the upper and lower layers overlapping at their leading lateral edges, and their trailing lateral edges adjacent to each other at the trailing end, the upper layer having respective upper actuator and upper hinge lug slots through with the metal actuator fitting insert and the hinge lug ply stack extend;

closing the female mold by placing the upper half over the lower half, such that the upper and lower layers are adjacent to inner molding surfaces of the cavity, the wrapped bladder extends through the leading edge portion of the cavity, the mandrel extends though the tapered portion of the cavity, each metal actuator fitting insert extends through the upper and lower actuator slots with its head disposed a cavity in the female mold and its root disposed between the overlying plies of upper and lower layers and underlying plies of wrapped bladder, each hinge lug ply stack extends through the upper and lower hinge lug slots with its head in compressible cavity in the female mold and its root extending through the upper and lower hinge slots and with at least a portion of plies from the root folded up between overlying plies upper and lower layers and underlying plies of wrapped bladder, the plies of the upper and lower layers, and the plies wrapped around the bladder having fibers extending a generally +45° and a −45° orientation with respect to the longitudinal axis;

applying pressure upon the mold halves to compress that portion of the plies in the upper and lower layers adjacent to the mandrel between surfaces of the mandrel and surfaces of the cavity in the tapered portion, and to compress that portion of the plies in the upper and lower layers in the trailing portion between molding surfaces of the upper and lower halves of the mold;

pressurizing the bladder to compress that portion of the plies wrapped around the bladder and adjacent to the mandrel against the mandrel, compress that portion of the plies of the wrapped bladder adjacent to the upper and lower layers with said portions of upper and lower layers against surfaces of the cavity in the leading edge portion, and compress the root portion of the hinge lug ply stack with corresponding overlying plies from the upper and lower layers and underlying plies around the bladder against surfaces of the cavity in the leading edge portion;

heating the mold to cure the resin in the plies during the applying of the pressure on the mold and the pressurizing of the bladder;

opening the mold and removing the cured part;

removing the bladder from the interior of the leading edge portion;

removing the mandrel from the interior of the tapered portion to provide the final cured part in the form of torsion box with a leading portion cavity in the leading portion provided by the bladder and a tapered portion cavity in the tapered portion provided by the mandrel with an inner or spar wall separating the leading portion and tapered portion cavities, the cured upper and lower layers of plies providing outer surfaces of the part, the cured plies that were wrapped around the bladder providing a thickened outer wall of the leading portions adjacent lateral edges of the upper and lower layer providing the thin trailing portion.

| Index of Part Numbers | |
|---|---|
| 101 | mold |
| 103 | mold cavity |
| 105 | lower half of mold |
| 107 | upper half of mold |
| 109 | longitudinal axis |
| 111 | lower layer of plies |
| 112 | upper layer of plies |
| 113 | pressurizable bladder |
| 115 | plies wrapped around bladder |
| 117 | wrapped bladder |
| 119 | rigid mandrel |
| 121 | trailing edge of lower layer |
| 122 | trailing edge of upper layer |
| 123 | leading edge of lower layer |
| 124 | leading edge of upper layer |
| 127 | upper actuator slot |
| 128 | lower actuator slot |
| 129 | upper lug slot |
| 130 | lower lug slot |
| 131 | metal actuator fitting insert |
| 133 | hinge lug ply stack |
| 135 | mold cavity for metal actuator fitting insert |
| 137 | mold cavity for hinge lug ply stack |
| 138 | mold insert for compressing hinge lug ply stack |
| 139 | mandrel stop in mold |
| 401 | spoiler |
| 403 | leading portion |
| 405 | trailing portion |
| 407 | tapered portion |
| 409 | actuator fittings |
| 411 | hinge lugs |
| 413 | trim lines |
| 415 | cut off portion of ends |
| 417 | leading edge cavity |
| 419 | tapered portion cavity |
| 421 | internal or spar wall |
| 425 | bulge in leading edge cavity |

DETAILED DESCRIPTION OF THE INVENTION

Figure 1:
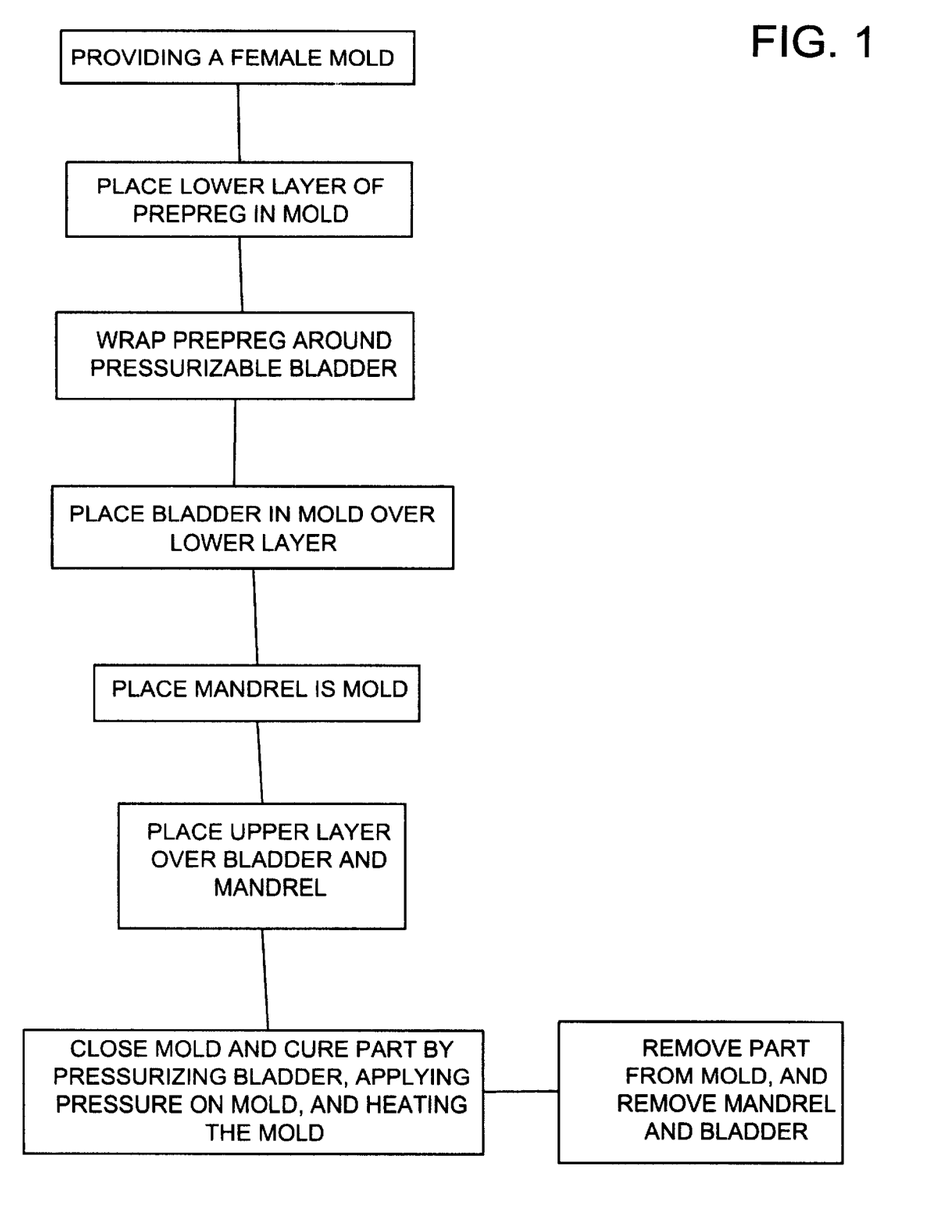
FIG. 1 is a flow sheet of an embodiment of the process of the invention.

Reference is made to FIG. 1, which a flow sheet of an embodiment of the invention. The present invention is a method for manufacturing an aircraft spoiler control surface. The method comprises the combination of internal pressure molding using a pressurizable bladder along with pressure applied by the mold to compress resin pre-impregnated fiber plies.

Figure 2:
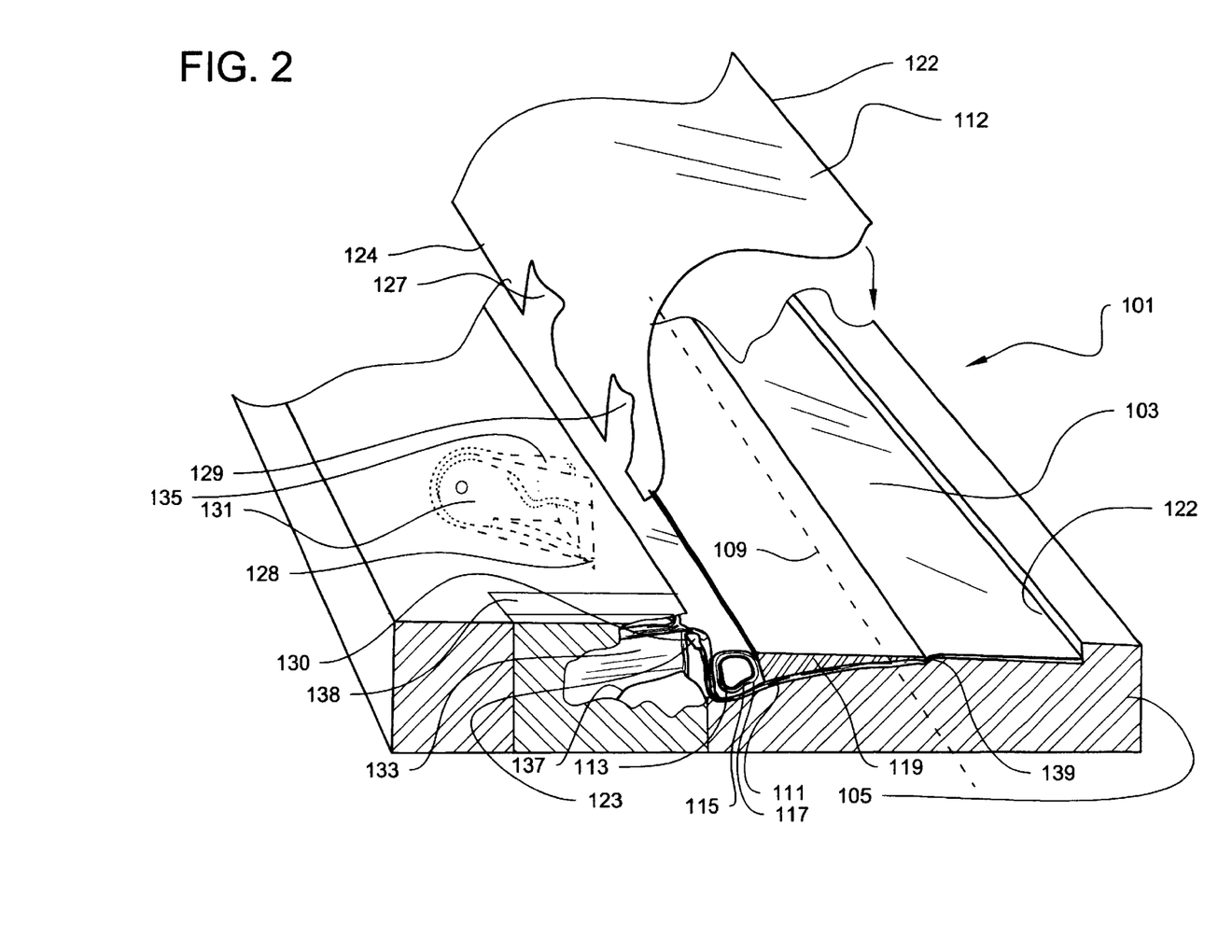
FIG. 2 is a perspective schematic view in cross-section of a portion of a lower half of a mold with the lower layer, the ply wrapped bladder, the mandrel, a metal actuator insert, and a hinge lug ply stack.
Figure 3:
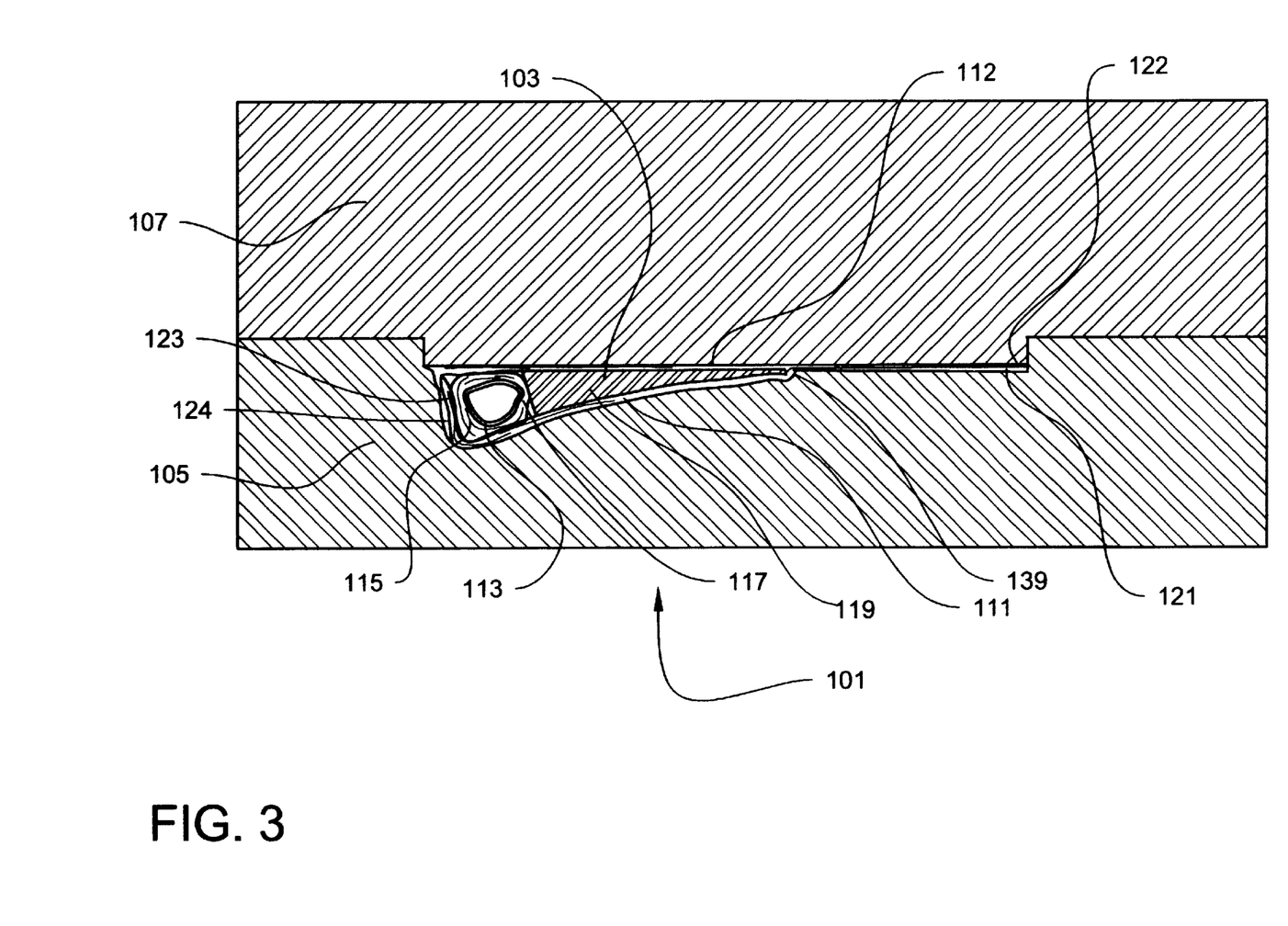
FIG. 3 is a schematic cross-section of a closed mold.

Referring also to FIGS. 2 and 3, a mold 101 with a female molding cavity 103 with a surface dimensioned to correspond with the outer dimensions of the part. The mold is separable into a lower half 105 and an upper half 107. Since the contours of the molding surface define the dimensions of the final pail, it is accordingly possible, with the exception of trimming flash and the ends of the pail, to mold a functional part with little or additional finishing of the part. The mold is cavity 103 is generally elongated to form a tubular torsion box shape, with a longitudinal axis 109 extending the length of the cavity, and has portions corresponding to the leading, tapered and trailing portions of the part.

A lower layer or stack of plies 111 is prepared of suitable resin-impregnated fibers. All of the plies in the stack are not required to extend the full length of the stack. For example, more plies may be provided near the regions where actuator fitting and hinge lugs are attached. In addition, the skin thickness can be tailored according to design needs to vary along the long and the width of the part.

A pressurizable bladder 113 is then provided. Resin-impregnated plies 115 are wrapped around the bladder 113 to form an elongated wrapped bladder 117 that extends the length of the mold. The wrapped bladder 117 is positioned in the cavity 103 over the lower layer 111 to thicken a portion of the outer walls of the part around the leading edge and provide an internal spar wall. The dimensions of individual plies 115 are determined according to design requirements, in particular the thicknesses of the leading edges and internal wall, which may vary through the part. The main requirement is that the plies be interleaved to avoid any joints or seams. The bladder may be made of any suitable material, such as those disclosed in the above cited patent applications, and is a flexible material capable of holding a suitable pressure under the curing temperatures.

The plies used in the lower layer 111 and the plies 115 to wrap the bladder 113 are any suitable resin impregnated fiber material. Because the final part is a torsion part, the fibers of the plies are oriented +45° and −45° to the longitudinal axis 109. Other plies may also be included, such as a ply of woven fibers on the outer and inner surfaces to improve the visual appearance and cutting properties for trimming of the final part. Resin-impregnated materials (prepreg) include any suitable resin-impregnated material known in the art. Examples include carbon fiber plies impregnated with epoxy resins.

A rigid mandrel 119 is then place in the mold cavity 103. The mandrel is placed adjacent to and generally parallel to the wrapped bladder 117, and is dimensioned to hold the wrapped bladder in place and to provide surfaces against which plies around the bladder and in the lower an upper layers 111, 112 are compressed during curing of the part. One or more resin-impregnated plies may optionally be wrapped around the mandrel before it is placed in the mold. The mold optionally includes a step 139 or stop that prevents the mandrel from sliding toward the trailing portion during compressing and forcing open the mold.

An upper layer of resin-impregnated plies 112 is placed over the wrapped bladder 117 and the rigid mandrel 119. The lower and upper layers 112 are dimensioned such that surfaces of the lateral edges 121, 122 at the trailing portion of the upper and lower layers come together to form the teardrop shape, with the lateral edges 121, 122 adjacent to each other. Leading edges 124, 123 of the upper and lower layers 111, 112 at the leading portion of the mold cavity 103 overlap to form a strong joint. Preferably the upper layer extends down over the lower layer as shown.

In order to provide a method for mounting metal actuator fittings and hinge lugs, slots are cut into the lower and upper layers 111, 112. A metal actuator fitting insert 131 comprises a head portion, which includes the appropriate means for attachment to the control mechanism of the aircraft, and a root portion which passes through upper and lower actuator slots 127, 128 in the upper and lower layers. The root of the insert 131 extends between overlying plies in the lower and upper layers and underlying plies around the wrapped bladder 117. Accordingly, when the part is cured the root will be integrally attached to the cured part. (The lower actuator slot 128, metal actuator insert 131, and mold cavity for the actuator insert 135 are shown in phantom.)

A stack of impregnated plies 133 is provided to form a hinge lug. A head portion of the stack extends from into a compressible cavity 137 in the mold. This forms a hinge lug that is designed to eventually be machined or drilled to incorporate bearings and pins for a hinge. The root portion passes through upper and lower lug slots 130, 131 in the upper and lower layers, respectively. A portion of plies on each side of the root extend between the plies of overlying plies in the lower and upper layers and underlying plies around the wrapped bladder 117. Accordingly, when the part is cured the root will be integrally attached to the cured part. The stack of impregnated plies may also include metal inserts, and a peripherial unidirectional plies extending though the lug slots 130, 131 to increase its strength.

The stack of impregnated plies 133 and the metal insert 131 may be inserted into the mold before the upper layer 112 is applied. As the upper layer is applied, its slots 127, 129 are aligned with the respective lower slots and fitted around the ply stack and insert the final part, the plies of the hinge lug extend into and are cured into the body of the part. Cavities 135, 137 are provided in the mold to accommodate the heads of the metal actuator insert 131 and the hinge lug stack 133, respectively. The cavity 137 for the hinge lug stack 131 is compressible to compress the stack from its sides. Compression can be applied any suitable means, such as by a tapered mold insert that compresses the stack when the mold is closed and pressure in applied, or by a mold insert 138 with separate pressure applying bolts. The mold is shown in FIG. 2 in partial cutaway to show the wrapped bladder 117, the lower lug slot 130, the compressible lug cavity 137, and the stack of impregnated plies 133.

In order to fill voids that may form in the part, filler materials of impregnated fiber may be used. These include, for example, woven threads or plies extending along the mold at the mold corners, the juncture of the trailing portion and the taper portion, and corners between the mold and the mandrel.

The mold 101 is then closed by placing the upper half 107 over the lower half. In the closed mold the lower and upper layers of plies 111, 112 are positioned to form the outer skin of the part. The plies 115 around the bladder 133 are disposed to form a portion of the outer or skin wall of the leading edge and a spar web or inner wall in the part.

The part is then cured by applying pressure to the mold halves to compress the plies of the lower and upper layers in the trailing portion, and compress plies in the lower and upper layers adjacent to the mandrel against the mandrel surfaces. The bladder is pressurized to compress the plies around the bladder against the mandrel surface and to compress plies around the bladder and adjacent plies in the lower and upper layers against the surface of the female mold. The plies of the root of the hinge lug stack are also compressed between the overlying plies of the lower and upper layer and underlying plies around the bladder. This co-cures the hinge lug firmly in the leading edge of the spoiler. The system is designed to form a spoiler in the form of a torsion box where the trailing edge and the hinge lugs are compression molded, and leading edge is thick walled.

Curing conditions are those suitable to provide the compression and cure the resin the part, such as those disclosed in the above cited patent applications. Typically, the curing temperature will be between 120 and 180° C., and the pressure in the bladder and the mold clamping pressure will between 80 and 200 psi. The pressurizing means for the bladder may by cycled to assist the bladder in conforming to the mold.

After the part is cured, the mold is opened and the part removed. The bladder is of a flexible material and can easily be pulled from the part. Since the bladder is flexible designs to avoid a trapped shape are not necessary for the bladder. This allows easy incorporation of and firm mounting of the hinge lugs and metal actuator fittings. In addition, the wall thickness in the leading edge region can be varied without concern of trapping the bladder. This may be required in the regions near the actuator fittings and hinge lugs to provide extra strength.

The mandrel is also removed. The part must be designed to prevent trapping the mandrel. This, however, is not a severe limitation because the tapered region around the mandrel is not attached to attachments or lugs. Accordingly, extra wall thickness to withstand localized loads is not required. Since the part has two open ends, two mandrels may be used and are removed from either end.

An advantage of the present invention is that the entire spoiler is manufactured at once and not as an assembly of several parts which must be riveted together. This provides great economies in manufacturing. Since the spoiler is one integral structure, structural integrity is improved. The process of the invention is particularly suitable for spoilers used in business class jets, because of the size and performance requirements of these aircraft.

Figure 4:
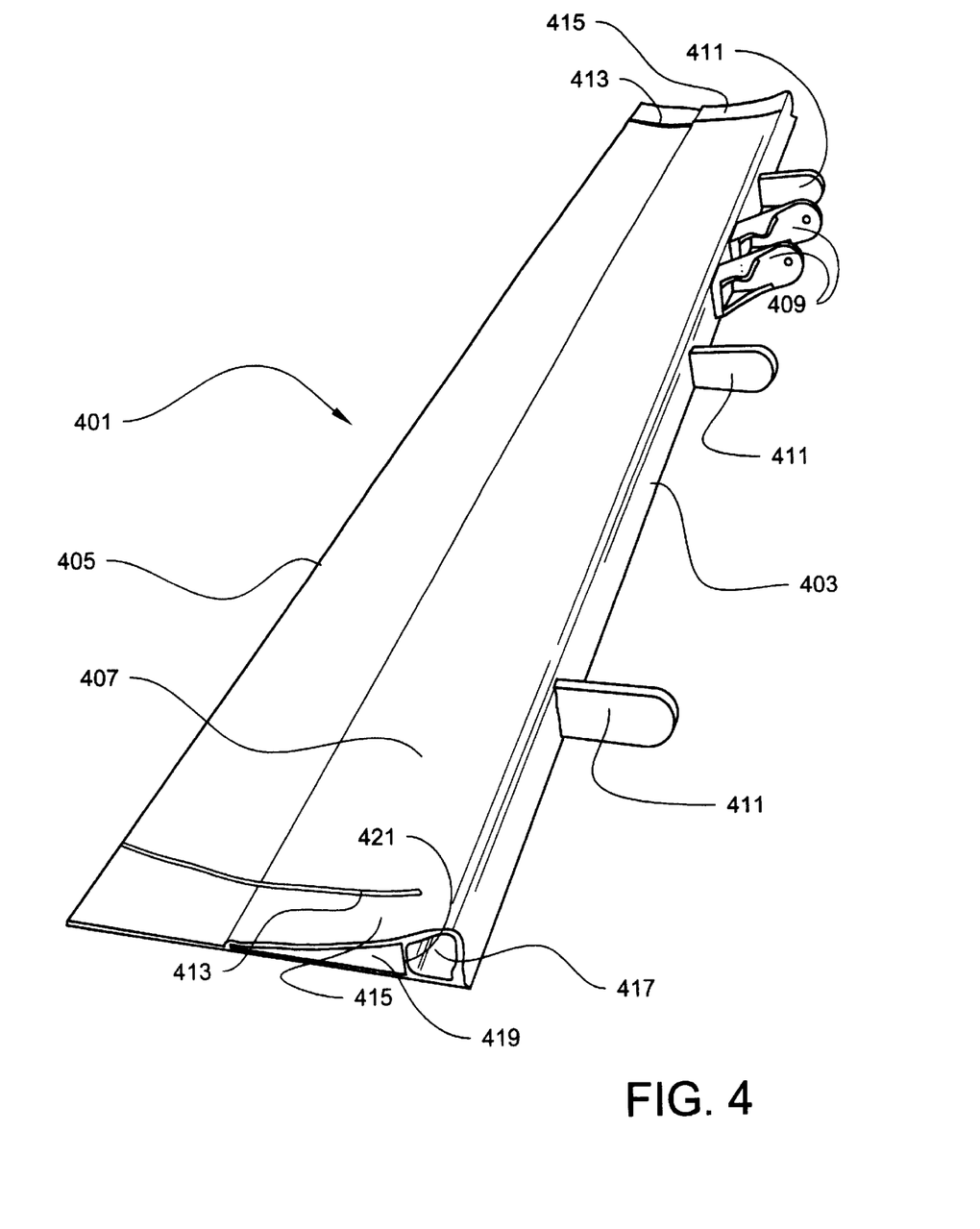
FIG. 4 is a perspective view of a finished spoiler manufactured by the process of the invention.
Figure 5:
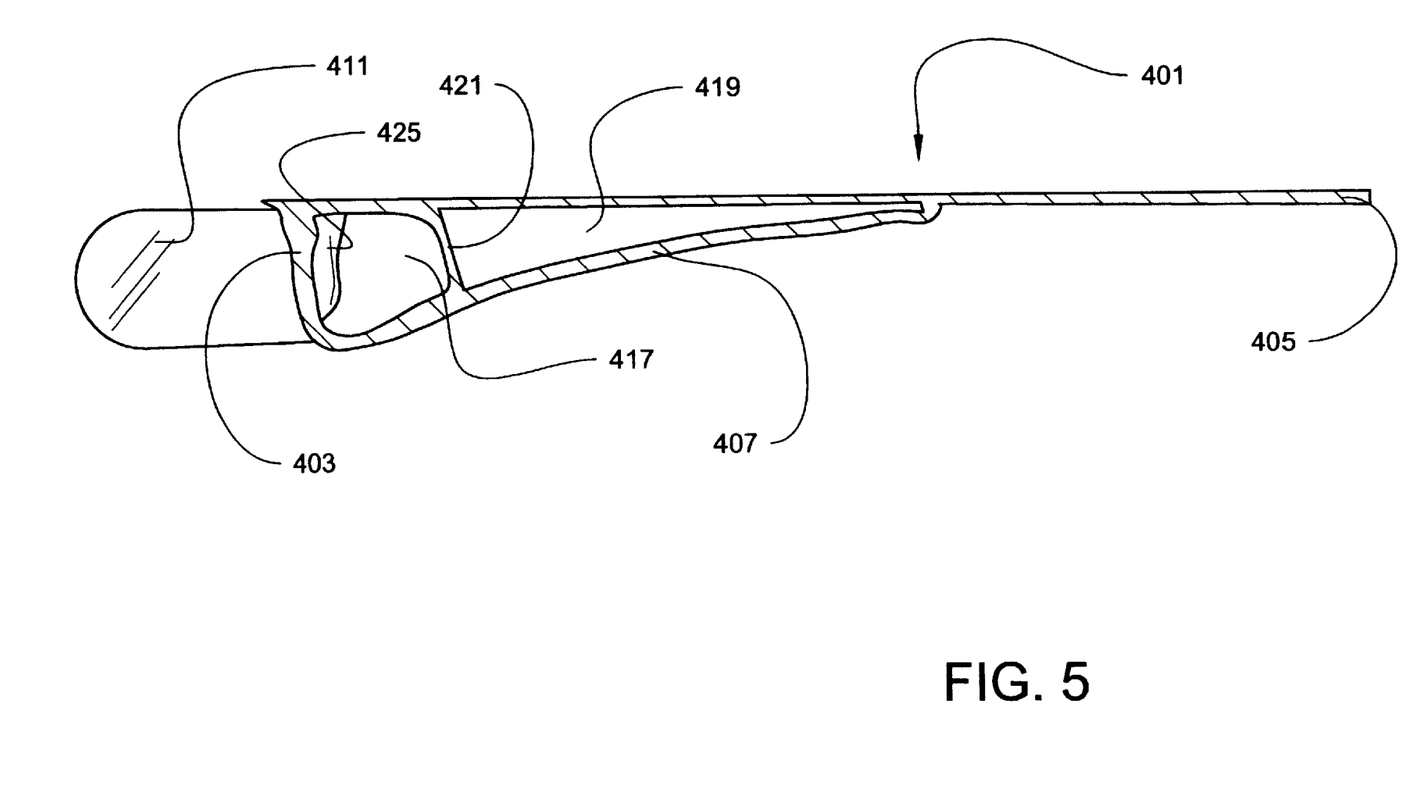
FIG. 5 is a cross-section of the finished part of FIG. 4, at the same location in FIG. 3.

Reference is now made to FIGS. 4 and 5, which show a perspective view and a cross-section of the final part. The part is dimensioned to function as a spoiler on a business-class jet. The spoiler illustrated in FIG. 4 is about 57 inches long, 8 inches wide, and 1.5 inches deep. The spoiler 401 is of generally tear-dropped cross-section suitable for its function as a spoiler, with a thick walled leading portion 403 and thin trailing portion 405 joined by a middle tapered portion 407. In the leading portion 403 are integral actuator fittings 409 that have been cured into the part, and hinge lugs 411 of fiber reinforced composite that were cocured with the part. For use as a spoiler the ends are suitable trimmed to the correct final dimensions. Trim lines 413 to show where the ends are to be trimmed are formed into the part during cure by corresponding lines in the mold. Either or both of the cut off ends 415 may be used as test coupons for quality control.

Referring particularly to FIG. 5, the part is of a torsion box design, with a leading portion cavity 417, a tapered portion cavity 419, with a spar or internal wall 421 there between. The tapered portion 407 tapers down from the leading portion 403 to the thin trailing portion 405. The trailing portion 405 contains no cavity. Also shown is a hinge lug 411, a bulge 425 in the leading portion cavity resulting from the root of the hinge lug co-cured in the wall.

While this invention has been described with reference to certain specific embodiments and examples, it will be recognized by those skilled in the art that many variations are possible without departing from the scope and spirit of this invention, and that the invention, as described by the claims, is intended to cover all changes and modifications of the invention which do not depart from the spirit of the invention.

What is claimed is:

1. A process for manufacturing an aircraft spoiler control surface of a generally elongated shape with a teardrop cross-section with a thick leading portion and a thin trailing portion joined by a middle tapered portion, the process comprising:

providing a female mold with a lower half and an upper half, with an elongated molding cavity dimensioned essentially the same as and corresponding to outer surfaces of the elongated shape and extending in the direction of a longitudinal axis, with a corresponding leading portion, a tapered portion and a trailing edge portion;

placing a lower layer of multiple plies of resin impregnated fiber into the lower half of the female mold with a leading lateral edge in the leading portion, and a trailing lateral edge in the trailing portion;

wrapping multiple plies of resin impregnated fiber around a flexible, pressurizable bladder;

placing the wrapped bladder in the mold over the lower layer in the leading portion of the cavity;

placing the rigid mandrel in the mold over the lower layer in the tapered portion with the rigid mandrel and the wrapped bladder extending adjacent to one another and extending generally parallel to the longitudinal axis of the cavity;

placing a upper layer over the wrapped bladder and the mandrel with a leading lateral edge in the leading portion and the trailing lateral edge in the trailing portion, and with the upper and lower layers overlapping at their leading lateral edges, and their trailing lateral edges adjacent to each other at the trailing end;

closing the female mold by placing the upper half over the lower half, such that the upper and lower layers are adjacent to inner molding surfaces of the cavity, the wrapped bladder extends through the leading edge portion of the cavity, the mandrel extends though the tapered portion of the cavity, the plies of the upper and lower layers, and the plies wrapped around the bladder having fibers extending a generally +45° and a −45° orientation with respect to the longitudinal axis;

applying pressure upon the mold halves to compress that portion of the plies in the upper and lower layers adjacent to the mandrel between surfaces of the mandrel and surfaces of the cavity in the tapered portion, and to compress that portion of the plies in the upper and lower layers in the trailing portion between molding surfaces of the upper and lower halves of the mold, pressurizing the bladder to compress that portion of the plies wrapped around the bladder and adjacent to the mandrel against the mandrel, compress that portion of the plies of the wrapped bladder adjacent to the upper and lower layers with said portions of upper and lower layers against surfaces of the cavity in the leading edge portion, and heating the mold to cure the resin in the plies during the applying of the pressure on the mold and the pressurizing of the bladder;

opening the mold and removing the cured part;

removing the bladder from the interior of the leading edge portion;

removing the mandrel from the interior of the tapered portion to provide the final cured pall in the form of torsion box with a leading portion cavity in the leading portion provided by the bladder and a tapered portion cavity in the tapered portion provided by the mandrel with an inner or spar wall separating the leading portion and tapered portion cavities, the cured upper and lower layers of plies providing outer surfaces of the part, the cured plies that were wrapped around the bladder providing a thickened outer wall of the leading portion adjacent lateral edges of the upper and lower layer providing the thin trailing portion.

2. A process for manufacturing an aircraft spoiler control surface of a generally elongated shape with a teardrop cross-section with a thick leading portion and a thin trailing portion joined by a middle tapered portion, and with at least one metal actuator fitting, and at least one hinge lug cocured into the leading edge portion of the shape, the process comprising:

providing a female with a lower half and an upper half, with an elongated molding cavity dimensioned essentially the same as and corresponding to outer surfaces of the elongated shape and extending in the direction of a longitudinal axis, with a corresponding leading portion, a tapered portion and a trailing edge portion;

placing a lower layer of multiple plies of resin impregnated fiber into the lower half of the female mold with a leading lateral edge in the leading portion, and a trailing lateral edge in the trailing portion;

wrapping multiple plies of resin impregnated fiber around a flexible, pressurizable bladder;

placing the wrapped bladder in the mold over the lower layer in the leading portion of the cavity;

placing the rigid mandrel in the mold over the lower layer in the tapered portion with the rigid mandrel and the wrapped bladder extending adjacent to one another and extending generally parallel to the longitudinal axis of the cavity;

placing a metal actuator fitting insert in the mold, the insert comprising a root portion and a head portion with the root portion extending through a lower actuator slot in the leading lateral edge of the lower layer;

placing a hinge lug ply stack in the mold, the hinge lug ply stack comprising a stack of plies of impregnated fiber with a root portion and a head portion with the root portion extending through an lower hinge lug slot in the lateral edge of the lower layer;

placing a upper layer over the wrapped bladder and the mandrel with a leading lateral edge in the leading portion and the trailing lateral edge in the trailing-portion, and with the upper and lower layers overlapping at their leading lateral edges, and their trailing lateral edges adjacent to each other at the trailing end, the upper layer having respective upper actuator and upper hinge lug slots through with the metal actuator fitting insert and the hinge lug ply stack extend;

closing the female mold by placing the upper half over the lower half, such that the upper and lower layers are adjacent to inner molding surfaces of the cavity, the wrapped bladder extends through the leading edge portion of the cavity, the mandrel extends though the tapered portion of the cavity, each metal actuator fitting insert extends through the upper and lower actuator slots with its head disposed a cavity in the female mold and its root disposed between the overlying plies of upper and lower layers and underlying plies of wrapped bladder, each hinge lug ply stack extends through the upper and lower hinge lug slots with its head in a compressible cavity in the female mold and its root extending through the upper and lower hinge slots and with at least a portion of plies from the root folded up between overlying plies of upper and lower layers and underlying plies of wrapped bladder, the plies of the upper and lower layers, and the plies wrapped around the bladder having fibers extending a generally +45° and a −45° orientation with respect to the longitudinal axis;

applying pressure upon the mold halves to compress that portion of the plies in the upper and lower layers adjacent to the mandrel between surfaces of the mandrel and surfaces of the cavity in the tapered portion, and to compress that portion of the plies in the upper and lower layers in the trailing portion between molding surfaces of the upper and lower halves of the mold, pressurizing the bladder to compress that portion of the plies wrapped around the bladder and adjacent to the mandrel against the mandrel, compress that portion of the plies of the wrapped bladder adjacent to the upper and lower layers with said portions of upper and lower layers against surfaces of the cavity in the leading edge portion, and compress the root portion of the hinge lug ply stack with corresponding overlying plies from the upper and lower layers and underlying plies around the bladder against surfaces of the cavity in the leading edge portion;

heating the mold to cure the resin in the plies during the applying of the pressure on the mold and the pressurizing of the bladder;

opening the mold and removing the cured part;

removing the bladder from the interior of the leading edge portion;

removing the mandrel from the interior of the tapered portion to provide the final cured part in the form of torsion box with a leading portion cavity in the leading portion provided by the bladder and a tapered portion cavity in the tapered portion provided by the mandrel with an inner or spar wall separating the leading portion and tapered portion cavities, the cured upper and lower layers of plies providing outer surfaces of the part, the cured plies that were wrapped around the bladder providing a thickened outer wall of the leading portion adjacent lateral edges of the upper and lower layer providing the thin trailing portion.

* * * * *